July 16, 1946. J. F. PETERS 2,403,995
METHOD OF MAKING FIBER CONTAINER BODIES
Filed Dec. 8, 1943
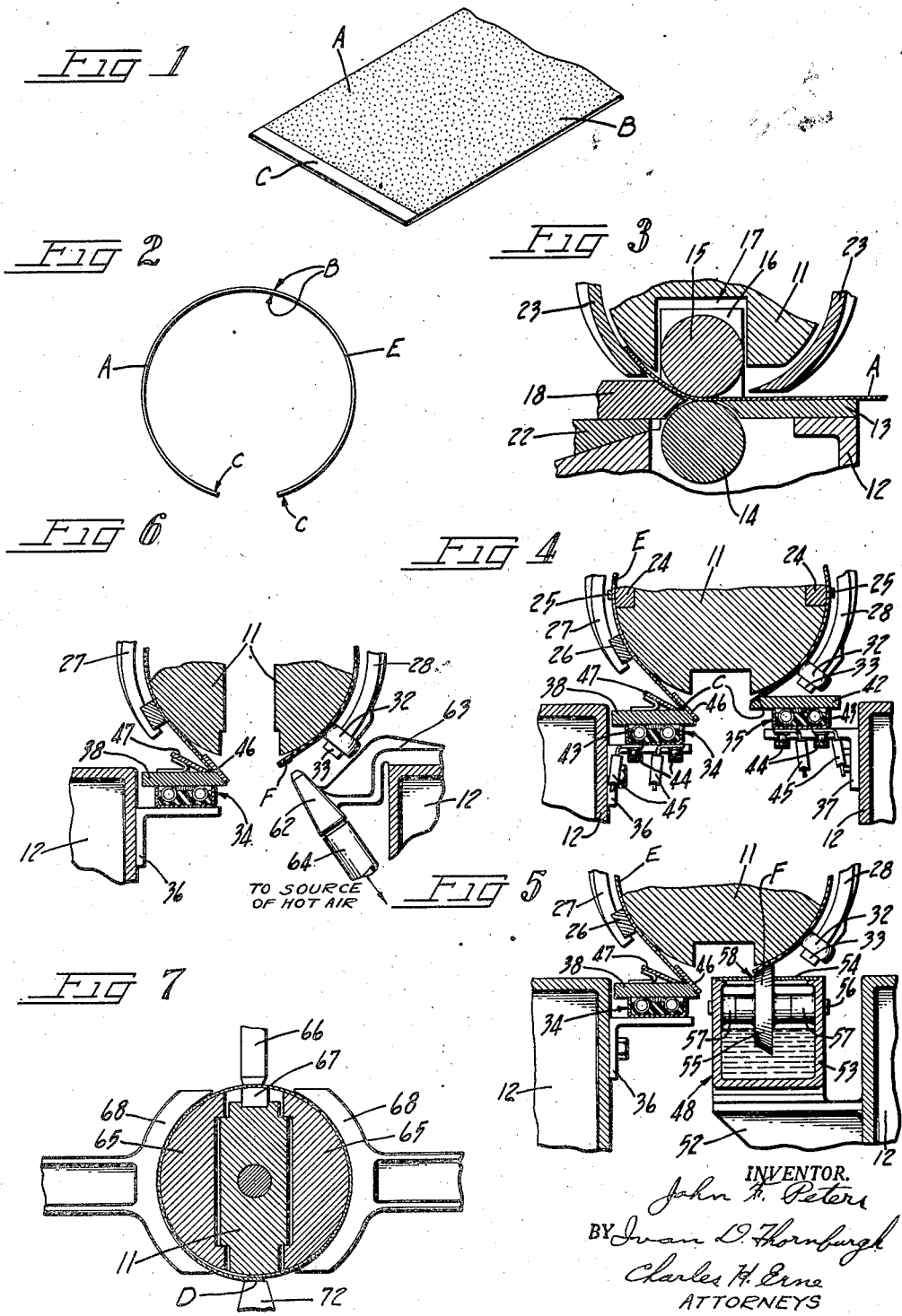

UNITED STATES PATENT OFFICE 2,403,995

METHOD OF MAKING FIBER CONTAINER BODIES

John F. Peters, Leonia, N. J., assignor to American Can Company, New York, N. Y., a corporation of New Jersey Application December 8, 1943, Serial No. 513,429

2 Claims. (Cl. 93—94)

The present invention relates to a method of making fiber container bodies and has particular reference to pre-heating portions of partially formed container bodies and applying adhesive to these portions to facilitate bonding them together as an incident to the manufacture of the bodies.

In the manufacture of fiber containers, thermoplastic adhesive frequently is used in the joints or seams to hold portions of the containers together. For best results, the adhesive is applied while in a hot liquid condition. In some instances, the adhesive becomes chilled by contact with the relatively cold container body and this chilling action prematurely hardens the adhesive so that it will not bond the body parts together.

The present invention contemplates overcoming this chilling action by preheating the portions of the body to be joined and this maintains the adhesive in a tacky condition until the portions are brought together preparatory to bonding them into a body joint.

An object of the invention is the provision of a method of making fiber container bodies wherein edge portions of partially formed container bodies are preheated prior to these areas being coated with a film of thermoplastic adhesive preparatory to joining the edge portions in a side seam, so that the adhesive will be maintained in a tacky condition until the edge portions can be brought together for joining.

Another object is the provision of such a method of making fiber container bodies wherein the forming of the bodies, the preheating of their side seam edge portions, the application of adhesive thereto, and the uniting of these edge portions into side seams are effected in a series of coordinated steps which are particularly adapted to automatic high speed production of such container bodies.

Numerous other objects and advantages of the invention will be apparent as it is better understood from the following description, which, taken in connection with the accompanying drawing, discloses a preferred embodiment thereof.

Referring to the drawing:

Figure 1 is a perspective view showing a portion of a fiber container body blank from which container bodies may be produced by the method steps of the present invention;

Fig. 2 is an end view of the container body blank shown in Fig. 1 after being formed into tubular shape with the opposite edge portions separated;

Fig. 3 is a sectional view of a body forming station in a typical apparatus which may be used for carrying out the method steps of the invention and showing a container body blank being formed into tubular shape;

Fig. 4 is a sectional view of a preheating station of such an apparatus showing the opposite edge portions of a partly formed container body in position for heating;

Fig. 5 is a view similar to Figs. 3 and 4 and showing an adhesive applying station for coating a heated edge portion;

Fig. 6 is a view similar to Fig. 4 and showing a reheating station wherein the adhesive coating on the edge portion of a container body is maintained in heated or tacky condition as it is reheated; and Fig. 7 is a sectional view of a body forming and bumping station showing the opposite edge portions of a container body being joined together.

As a preferred embodiment of the invention the drawing illustrates a method of and an apparatus for carrying out the steps of the method, the final result being a fiber container body having a glued or adhesively secured side seam. The bodies are made preferably from flat rectangular shaped fiber blanks A. In some cases the major portion of the blank may be covered with a protective coating material B leaving uncoated only a marginal edge portion C at each end of the blank, the uncoated part providing the proper area for joining the edges together in a glued or adhesively secured side seam.

As the first step in the method of producing such containers, the blanks A are bent into container body shape. This step results in a partially formed container body having its side seam edges extending from the body in a separated relation, as best shown in Fig. 2. Following this forming step, the side seam edge portions C of the body are preheated, i. e., subjected to a heat treatment at a preheating zone, to thoroughly heat these portions of the body so that the adhesive when applied will not be chilled so as to immediately cool or harden.

While the preheated edge portions are still hot, a film of thermoplastic adhesive is applied preferably to one of them. This is the third step in the method and is performed at what may be termed an adhesive applying zone. The preheated and adhesive coated edge portions are then brought together in overlapping relation with the adhesive therebetween and are pressed together to bond said portions in a tight seam which holds the body together. This completes the body and these latter mentioned steps of the method are carried out at a seam forming zone.

In some cases a delay in bringing the edge portions of the body together as an incident in producing the side seam, may cause the adhesive to harden or cool to such an extent that it will not perfectly and uniformly bond the edge portions together. In this invention provision is also made for keeping the applied adhesive in a tacky condition over a period of time. This step comprises the reheating or the continued auxiliary heating of the applied adhesive until the two edge portions are brought together.

Certain principal features of one form of apparatus, as illustrated in the drawing for carrying out the method steps of the instant invention, includes a stationary body forming horn 11. This horn extends longitudinally of the apparatus and is supported above a main frame 12 in any suitable manner. A feed table 13 is mounted on the main frame and is disposed between it and the horn 11 (Fig. 3). It is along the table 13 that the prepared container body blanks A are fed individually and endwise into the apparatus at the feed-in end thereof.

Each blank A as it moves across the table 13 is picked up by a pair of feed rollers which comprise a lower or drive roller 14 and an upper or pressure roller 15. The drive roller is journaled in the main frame below the table and is operated in any suitable manner in time with other parts of the apparatus.

The pressure roller 15 is carried in a bearing 16 above the table and is located in a recess 17 of the horn. The rollers 14, 15 advance the blank into endwise engagement with a forming block or element 18 which deflects the blank out of its straight line path of travel and thus bends it into a partially formed tubular can body E. During this forming operation the blank curls upwardly around the horn.

A wedge piece 22, inserted between the forming block 18 and the table 12, supports the block in a desired position relative to the feed rollers to effect the forming of the blank into a container body shape. Circumferential guides 23 hold the partially formed body on the horn 11. These guides may be carried on a support mounted above the horn in any suitable manner.

The preheating of the side seam edges C of the partially formed can body E is brought about preferably while the body is on the horn and by devices which are disposed adjacent the horn. For this purpose the body is advanced along the horn successively through the described preheating, adhesive applying and seam forming zones by means of a plurality of intermittently operated reciprocable feed bars 24 disposed in slideways formed in the horn. These bars carry depressible feed dogs 25 spaced at intervals along their lengths for engaging behind the bodies. During this advancement, the bodies are retained in place on the horn by longitudinal guide rails 26 secured to curved arms 27, 28 disposed adjacent the horn.

A series of pressure rollers 32 bear against the advancing container bodies adjacent one of their marginal edge portions C (at the right as viewed in Fig. 4) and thus keep this portion of each body against the horn, during certain subsequent operations. These rollers are mounted on studs 33 secured in the lower ends of the curved arms 28.

As the partially formed body E moves along the horn to or through the preheating zone, its opposite marginal edge portions C are first heated by heating devices 34, 35 located beneath the horn. These heating devices are carried on angle brackets 36, 37 secured to the main frame. Each of the devices 34, 35 includes a heater track 38, 42 which is heated by "Calrod" electric heating elements 43. These elements are secured by thumb screws 44 to lead wires 45, which are connected with a suitable electric circuit.

The heater track 38 carries an angularly disposed heater rail 46 and a spaced and angularly disposed guide rail 47 between which a marginal edge portion C of the body (as viewed on the left of Fig. 4) is guided as the body moves along the horn. The heater rail 46 is heated by the heater track 38 and as it is engaged by the face of the uncoated inner marginal edge portion C, it heats this portion. The heater track 42 in like manner engages directly against the other or outer marginal edge portion C and thus heats this edge portion. It is these devices that pre-heat the body edge portions, as hereinbefore explained.

The container body now is advanced to the next station or adhesive applying zone (Fig. 5) where a coating of heated thermoplastic adhesive is applied to the pre-heated outer marginal edge portion. The inner edge portion meanwhile moves along adjacent the heater rail 46 and continues to be heated. An adhesive applying device 48 is located at this station below the horn 11 and is carried on a bracket 52 of the main frame. This device includes an open top adhesive reservoir 53 which contains the thermoplastic adhesive and which may be heated in any suitable manner. The reservoir is provided with a loose removable cover 54.

Within the reservoir 53 an adhesive applying roller 55 is mounted on a shaft 56 journaled in bearings 57 formed in the reservoir. This roller extends up through an opening 58 in the cover 54 and projects into the path of travel of the preheated outer marginal edge portion C of each container body E advancing along the horn.

As the container body E moves adjacent the adhesive applying device 48 its outer marginal edge portion C frictionally engages and rotates the applying roller 55. The rotating roller carries up the adhesive from the reservoir and applies a film F onto the outer edge portion of the body. The face of such a roller preferably is beveled to facilitate engagement with this edge portion for more even distribution of the adhesive.

The container body preferably is next advanced to the reheating station (Fig. 6) wherein both marginal edge portions are maintained in heated condition prior to being joined together. For this purpose the inner marginal edge portion still remains in position between the guide rail 47 and the heater rail 46 of the heating device 34 and thus is heated continually as it moves therealong. The outer marginal edge portion with its adhesive coating F now is subjected to a stream of hot air which is directed into the path of travel of this edge portion. This maintains the coating in a tacky condition.

One or more nozzles 62 may be used for directing the stream of hot air against the coating F. Such nozzles are located beneath the horn 11 (Fig. 6) and are formed integral with a bracket 63. This bracket is secured to the main frame.

The nozzles are connected by a pipe 64 with a suitable source of hot air.

In order to bring the body edge portions together in a side seam to thus complete the partially formed container body it now is advanced to the next station or seam forming zone (Fig. 7). At this station the body is positioned on an expansible section of the body forming horn 11. This part of the horn is of the conventional form and includes movable segments 65 carried on opposite sides of a substantially rectangular section of the horn 11.

With a container body in position on the horn (Fig. 7), a hold-down bar 66 moves down against the body and clamps it against an insert 67 secured in the horn. This keeps the body in place on the horn during the seam forming operation. As an incident to forming the seam, wing forming elements 68 move inwardly against the body as it is backed up on the expansible segments 65 and bring the prepared marginal edge portions C into overlapping relation with the adhesive therebetween preparatory to joining them together. The joining of the edge portions is effected by a bumping element 72 which is located below the horn and which is moved up at the proper time to engage against the overlapped edge portions to press them together tightly and thus bond them into a longitudinal side seam D. This completes the tubular container body.

The container body after being completed at the station just described is removed from the discharge end of the horn. This is effected only after the movable segments 65 of the expansible section (Fig. 7) are collapsed from their expanded position as shown in the latter figure. As the segments 65 start moving inwardly, the hold-down bar 66 moves up releasing its hold on the body and the bumping element 72 moves down away from the body side seam. Simultaneously with this action the wing forming elements 68 move outwardly releasing their hold on the body and thus free it so that it may be shifted endwise off the horn. This may be done in any suitable manner.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. A method of producing tubular fiber container bodies having marginal edge portions embodied in an adhesively secured side seam, which comprises forming a fiber body blank into substantially tubular shape to produce a partially formed container body, feeding said body successively through preheating, adhesive applying and seam forming zones, preheating the side seam edge portions of said body at said preheating zone, applying a film of heated adhesive to one of said preheated side seam edge portions while continuing the preheating of the other edge portion at said adhesive applying zone, and bringing said preheated side seam edge portions together in overlapping relation with the adhesive interposed therebetween and pressing the overlapped edge portions together to bond them into an adhesively secured side seam to complete the tubular body at said seam forming zone.

2. A method of producing tubular fiber container bodies having marginal edge portions embodied in an adhesively secured side seam, which comprises forming a fiber body blank into substantially tubular shape to produce a partially formed container body, feeding said body successively through preheating, adhesive applying and seam forming zones, preheating the side seam edge portions of said body at said preheating zone, applying a coating film of heated adhesive to one of said preheated side seam edge portions while continuing the preheating of the other edge portion at said adhesive applying zone, heating the coated edge portion to maintain the tacky condition of the adhesive after application thereof, and bringing said preheated side seam edge portions together in overlapping relation with the adhesive interposed therebetween and pressing the overlapped edge portions together to bond them into an adhesively secured side seam to complete the tubular body at said seam forming zone.

JOHN F. PETERS.